(12) United States Patent
Hoyt

(10) Patent No.: US 6,693,710 B1
(45) Date of Patent: Feb. 17, 2004

(54) POLARIZATION IMAGING SYSTEM

(75) Inventor: Clifford C. Hoyt, Needham, MA (US)

(73) Assignee: Cambridge Research & Instrumentation Inc., Boston, MA (US)

( * ) Notice: Subject to any disclaimer, the term of this patent is extended or adjusted under 35 U.S.C. 154(b) by 271 days.

(21) Appl. No.: 09/595,827

(22) Filed: Jun. 16, 2000

(51) Int. Cl.$^7$ ................................................. G01J 4/00
(52) U.S. Cl. ..................................................... 356/365
(58) Field of Search ................................ 356/491, 365

(56) References Cited

U.S. PATENT DOCUMENTS

| | | | |
|---|---|---|---|
| 4,171,908 A | 10/1979 | Robert et al. | 356/33 |
| 4,914,487 A | 4/1990 | Croizer et al. | 356/35 |
| 4,973,163 A | 11/1990 | Sakai et al. | 356/367 |
| 5,400,131 A | 3/1995 | Stockley et al. | 356/33 |
| 5,521,705 A | 5/1996 | Oldenbourg et al. | 356/368 |
| 5,917,598 A | 6/1999 | Mason | 356/351 |

*Primary Examiner*—Frank G. Font
*Assistant Examiner*—Andrew H. Lee
(74) *Attorney, Agent, or Firm*—Cohen, Pontani, Lieberman & Pavane

(57) ABSTRACT

A polarization imaging system and method are disclosed for measuring the magnitude and orientation of retardance in a sample. There are no moving parts and the invention is readily constructed as an imaging system that obtains polarization values at all point in a scene simultaneously. The system first takes an image that records the apparent slow axis orientation and the apparent retardance. However, the apparent retardance is indeterminate by $m\lambda$, the wavelength of observation. By recording such images at two wavelengths, and taking note of both the apparent phase and the angular orientation of polarization interference in each of the two cases, the system is able to determine retardance values of $5\lambda$ or more at every point without ambiguity. The actual slow axis orientation is determined as well. The determination of retardance value and axis orientation is independent for each point measured, and does not make use of spatial relationships or distributions within the sample.

48 Claims, 11 Drawing Sheets

POLARIZATION IMAGING SYSTEM

BACKGROUND OF THE INVENTION

1. Field of the Invention

The invention is directed toward systems for measuring materials properties such as strain, crystallinity, thickness, purity, composition, and the like of samples; or for observing structures in transparent materials; or, for measurement of strain in models constructed for that purpose. It is more narrowly directed toward measuring systems that utilize polarized light for such measurements. It may be used in applications including scientific research, industrial measurement, quality control, forensics, and medical imaging.

2. Description of the Related Art

Polarization interference is a well-known way to observe birefringence or retardance in a sample. Birefringence is an intensive property of a sample whereby light polarized along different axes will experience different indices of refraction. The axis along which the index is lowest is termed the fast axis, and that along which the index is highest is termed the slow axis; these are necessarily perpendicular to one another. The optical indices are termed $n_f$ and $n_s$.

Retardance is an extensive quantity measuring the total optical path difference experienced in passing through a sample, so for a uniform sample at normal incidence $$R = (n_s - n_f) * d \quad [1]$$

where $n_f$ and $n_s$ are the optical indices for light polarized along the fast and slow axes, respectively, and d is the thickness of the sample. More generally, in a sample where the values of $n_s$ and $n_d$ may vary along the line of sight due to e.g. inhomogeneities, but the fast axis orientation is constant, R is the integral of index difference over distance.

When a birefringent object is viewed through parallel or crossed linear polarizers, a pattern of colored fringes is seen. If the orientation of the slow axis varies across the face of the part, the fringe pattern will change as the polarizers are rotated. Alternatively, one may illuminate the sample in left-hand circularly polarized light and view it with a left-hand circular polarizer. This eliminates the dependence on polarizer orientation, while preserving the location and color of the fringes. These colored fringes (which simply appear light and dark when viewed in monochromatic light) are termed the set of isochromes, the lines consisting of the locii of points that share a given value of δ.

Another set of crucial patterns is the isoclines, being the locii of points which are completely extinguished when the sample is viewed between crossed polarizers. The isoclines change when the polarizers are rotated relative to the sample, and indicate those points where the principal optical axis in the sample is parallel to one of the polarizers. The isoclines are often used to determine the crystal orientation, or a stress distribution, throughout a sample. But observations of this type alone do not reveal which is the fast axis and which the slow axis.

There is a large literature describing apparatus and methods for determining the retardance in a sample. These are typically based on the intensity of the interference pattern of the isochromes, given by:

$$I = I_0 \cos(\delta)^2 \quad [2a]$$

for a sample placed between parallel polarizers, or $$I = I_0 \sin(\delta)^2 \quad [2b]$$

when between crossed polarizers, where $$\delta = \pi R / \lambda \quad [3]$$

and $I_0$ is the intensity of the incident light, which is monochromatic with wavelength λ. Polychromatic light may be analyzed as a sum or integral of various wavelength components.

Equations [2a] and [2b] do not specify a unique value of δ for a given observed intensity I, because the sin( ) and cos( ) functions are periodic. Typically, these equations are solved to yield a value $\delta_0$ in the range [0, π/2], which is related to the actual δ by either $$\delta = m\pi + \delta_0 \quad [4a]$$

or $$\delta = m\pi - \delta_0 \quad [4b]$$

where the indeterminacy between [4a] and [4b] arises from the fact that cos( )² for either of these two arguments yields the same answer; this is also true of sin( )². Simply measuring the pattern of isochromes between crossed or parallel polarizers does not provide enough information to specify which case applies, and combining crossed and parallel measurements gives no further data, since sin( )² and cos( )² are inherently complementary. Then there is the further indeterminacy of the order m. So, in attempting to relate a retardance to an observed intensity between polarizers, one must overcome the uncertainty in order, m, and also determine whether the sample is described by equation [4a] or [4b].

In analogy with the description of $\delta_0$ as the apparent phase, one may speak of the apparent retardance $R_0$ which is defined to lie in the range [0, λ/2] and is related to the actual retardance R by $$R = m\lambda + R_0 \quad [5a]$$

$$R = m\lambda - R_0 \quad [5b]$$

Except when the actual retardance is known to be less than λ/2, one must use [5a] or [5b] together with a determination of the order, m, to calculate the actual retardance.

Some hardware used for polarization interference measurements provides additional data through the use of additional sensors, polarizing elements, waveplates, photoelastic modulators, and the like.

Oldenbourg et. al. U.S. Pat. No. 5,521,705 teaches how to unambiguously identify the slow axis and value of δ for a retarder. This method uses an imaging detector and variable retarders, but it only functions for δ in the range [0, π/2]. It is unable to determine the order, m.

Mason U.S. Pat. No. 5,917,598 teaches how to identify the fast axis using circularly polarized illumination and multiple linear polarizing analyzers with different orientations. This system appears to resolve phase $\delta_0$ over the range [0, π/2] for monochromatic light, or over a wider range of $\delta_0$ for broad-band light analyzed with a spectrometer. The determination of order, m, is only possible when broad-band light is used, and comes from analysis of the spectral distribution. But the requirement for a spectrometer to analyze the content of light passing through the sample means that system is limited in practice to measuring a single point in the sample at a time.

Croizer et. al. U.S. Pat. No. 4,914,487 determine isochromic fringes and then calculate absolute retardance by presuming stress levels at the end points of the sample, and integrating spatially across the sample using a finite-element stress equation. Since stress is related to birefringence by the stress-optic tensor, the stress equation provides additional information about birefringence levels that is said to allow unambiguous determination of $\delta$ from $\delta_0$, provided that the birefringence in the sample is entirely due to stress rather than e.g. crystallinity or other internal structures. Further, it requires one to spatially oversample, i.e. have a pixel scale that is considerably finer than any of the structures present, in order to perform the integration accurately. In practice, this approach is slow because of the need for the calculation step, and has proven unreliable when applied to real-world samples.

Others have observed samples at multiple wavelengths in an attempt to determine retardance in excess of $\lambda/2$.

Young uses a linear polarizer to illuminate a single point in a sample, which is analyzed by a quarter-wave plate whose angle is keyed to that of the entrance polarizer, followed by a final rotating linear polarizer used as an analyzer. This last element is rotated to seek maximum extinction, and the angle of maximum extinction is noted. This is performed while the sample is illuminated at two wavelengths in turn. From the combinations of the polarizer setting angles, retardances in excess of $\lambda/2$ are identified. But the system is inherently point-wise in nature, and cannot be readily extended to produce an image of retardance at every point in an object, except by taking a grid of point-wise measurements. This is impractical when one seeks images having even moderate spatial definition. For example, a conventional video image has resolution of 640×480 pixels, thus contains 307,200 individual points, which would take in excess of a day to acquire at 1 second per point.

Robert et. al. U.S. Pat. No. 4,171,908 uses a rotating-polarizer system to make point measurements at two wavelengths together with another sensor that incorporates a quarter-wave plate whose orientation is servo-controlled, in order to determine the fast axis and the relative phase ($\phi 2-\phi 1$) between the two wavelengths. Phase-sensitive information from the polarizer and servo-control of the quarter-wave plate indicates the sense of the relative phase. While it is said to provide complete information about the sample retardance, this arrangement is complex and has many moving parts. Further, it measures only a point at a time, so is ill-suited to providing a high-definition image of birefringence or retardance across an entire sample. As with Young, when an image is desired, one must account low speed as an additional shortcoming, along with the expense, complexity, and size involved.

Sakai et. al. in U.S. Pat. No. 4,973,163 uses two wavelengths to resolve order by comparing all possible R that satisfy the observed value of $R_0(\lambda_1)$ against all possible R that satisfy the observed $R_0(\lambda_2)$, then choosing the value that is most compatible with both readings. Identification of fast and slow axes is not addressed in this teaching. Contrary to the teaching, however, this method does not provide an unambiguous determination of R, since there are in fact many cases where two different values of R yield the same set of readings $\{R_0(\lambda_1), R_0(\lambda_2)\}$. Examples are provided below in connection with the Stockley et. al. patent. Thus, Sakai et. al. does not actually provide for unambiguously determining retardance.

Sakai et. al. also teach use of three $\lambda$ and comparison amongst $R_0$ obtained at each of them to arrive at a unique value of R consistent with all three, using a Cauchy fit to account for birefringence dispersion. This could remove the ambiguities inherent in the two wavelength approach, but requires taking a third set of measurements at a third wavelength, and even then would only work if one had a Cauchy fit to the material, which is often unknown. With this approach, one would face the situation that the optical properties of the sample material need to be known, before a sample can be measured.

In U.S. Pat. No. 5,400,131, Stockley et. al. teach use of measurements at wavelengths $\lambda_1$ and $\lambda_2$ together with a look-up table, to obtain a value of R from the two measured $R_0$. However, this system suffers from the same ambiguities as the Sakai et. al. system, which are either not recognized or not acknowledged by the inventors. FIG. 6 of this patent clearly illustrates the shortcomings of the system. It is a graph with $R_0(\lambda_1)$ and $R_0(\lambda_2)$ as the x and y axes, on which a curve is plotted that indicates the value of R corresponding to the observed $R_0$ coordinates. Yet whenever this curve crosses over itself, as it does many times in the Figure, there are two quite different values of R that fit the observations equally well, leading to ambiguous determination of R. On this crucial issue the teaching is silent. This is the same defect mentioned in connection with Sakai et. al. and it is equally limiting here.

Stockley et. al. also teach a system using three wavelengths that are chosen to fit a geometric series, i.e. $\lambda_1 * \lambda_3 = (\lambda_2)^2$. Two wavelengths at a time are combined to yield a ramp function. From two such ramp functions, it is said to be possible to resolve the actual retardance from the apparent retardance values $R_0$. The output of the ramp processing is a retardance map that is periodic over the range $[0, \pi]$ and has discontinuities at the boundaries corresponding to $\delta = m\pi$. These must be detected and fixed by spatial analysis of the structure being imaged, in which a computer stitches together an image that resolves the proper order m for each region based on the observed discontinuities and the overall topology. This suffers the same problems as the Croizer approach described above, since it requires computation, and there must be significant spatial oversampling and/or certain assumptions must be made about the structure being imaged.

By extending the observation from two or three wavelengths to a complete spectrum, Mason in U.S. Pat. No. 5,825,493 teaches measurement of retardance in excess of $\lambda/2$. The hardware uses a broad-band source for illumination and a spectrometer for analysis. For each point to be imaged, a spectrum is acquired and compared to a reference spectrum obtained with no sample present; from the spectral ratio, the retardance is determined. This suffers from the same limitations as the other system of Mason, namely the need for a spectrometer which makes it inherently a point sensing system that cannot readily be used to produce a two-dimensional image of a sample.

In summary, while there is extensive art for obtaining and interpreting isochrome and isocline images, none are satisfactory for providing identification of the fast and slow axis together with unambiguous determination of R in excess of $\lambda/2$ across a complete image. All methods that seek to provide such information suffer from one or more of the following limitations: need for spatial analysis of the image to resolve order; reliance on stress-integral analysis to resolve order and provide axis determination; need for a priori knowledge about the distribution of stress and/or birefringence in the sample; possibility for confusion of certain values of retardance with other, widely-different values of retardance; need for observations at three wavelengths or across a continuous spectrum; inherent limitations that in theory permit measuring at most a line at a time, and in practice, a single point at a time.

Thus there is no system presently known for measuring retardance in excess of $\lambda/2$ that is reliable, that provides a high-definition image of the sample, that identifies the fast and slow axis orientation, that needs no predetermined information about the sample, and does not rely upon spatial distribution in the sample to resolve order from apparent phase $\delta_0$ or apparent retardance $R_0$.

SUMMARY OF THE INVENTION

It is a goal of the present invention to obtain images of retardance in a sample where R can exceed $\lambda/2$, and more typically can be $5\lambda$ or more. It is another goal to provide a determination of R that is independent for each point, with no need for spatial analysis or a priori knowledge of the sample. A further goal is to eliminate the need for taking spectra, and to provide a high-definition image of the entire sample at once.

Yet another object of the present invention is to eliminate ambiguities and misidentifications of R, and to enable any sample to be measured without prior knowledge such as a Cauchy dispersion fit to birefringence. To the contrary, rather than needing this information as an input, it is an aim of the present invention to provide a determination of birefringence dispersion in the sample as part of the measurement.

The invention is based on the recognition that, when observing at a wavelength band centered at $\lambda_1$, a retarder having $R=\alpha$ and a fast axis oriented at angle $\beta$ is indistinguishable from a retarder having $R=m\lambda_1-\alpha$ and a fast axis oriented at $\beta+\pi/2$. Similarly, when observed at $\lambda_2$, the retarder may appear to have $R=m\lambda_2-\alpha$ and a fast axis oriented at angle $\beta+\pi/2$. Yet, in a real sample, the fast axis does not vary with the wavelength of observation. This provides an additional constraint on the problem which may be used to eliminate the ambiguities that are present in prior art approaches.

At its simplest level, one may use hardware such as that of Oldenbourg to obtain an image of $R_0$ in the range $[0, \pi/2]$ and to identify the fast axis orientation at each point in a sample, at each of two wavelengths $\lambda_1$ and $\lambda_2$. Then, LUTs are used to convert apparent retardance $R_0$ to actual retardance R, as in Stockley et. al., except that two LUTs are constructed rather than one, and one LUT or the other is used depending on whether the apparent fast axis orientation is approximately the same, or approximately orthogonal, at the two wavelengths. The former LUT table is populated along lines having slope $z\approx+1$ while the other is populated along lines having $z\approx-1$. There are no intersections or crossed lines on either LUT, nor any case where two different R values correspond to a given set of observed $\{R_0(\lambda_1), R_0(\lambda_2)\}$. Thus, there is no ambiguity in deriving R correctly.

Additional features include using empirical knowledge of the signal-to-noise in the system to describe the maximum possible error in $R_0$ at each wavelength, from which one can determine that certain combinations of $\{R_0(\lambda_1), R_0(\lambda_2)\}$ are possible, while others cannot occur. This amounts to demarcating certain bands in the LUT as valid, and given values for R, while others are simply marked as invalid. The bands are different for the LUT where the fast axes are coincident, and the LUT where they are different. If the LUT indicates that the measured combination is invalid, the data may be marked as no good. This provides a measurement integrity check on the system.

Also, construction of the invention as an imaging system provides ready access to a large population of pixels, corresponding to different spatial locations in the sample. These can be arranged as a scatter-plot using the axes $R_0(\lambda_1)$ and $R_0(\lambda_2)$, and the population distribution may be observed. By noting which regions are populated, the relative degree of dispersion in birefringence can be observed. The effect of birefringence dispersion is to alter the slope z slightly from the dispersion-free nominal values of $z=+1.00$ or $z=-1.00$. Determination of birefringence dispersion, in turn, can be used to revise the LUTs for use with that particular material. Other aspects of the invention will be apparent from the Figures and description of the preferred embodiment, which are now presented.

BRIEF DESCRIPTION OF THE DRAWINGS

In the drawings:

FIG. 5b shows the equivalent LUT for the case where the apparent fast axis orientations are approximately perpendicular for the two wavelengths. The locus of points is a set of nonoverlapping line segments 56a, 56b, and so on.

DETAILED DESCRIPTION OF THE PRESENTLY PREFERRED EMBODIMENTS

Figure 1:
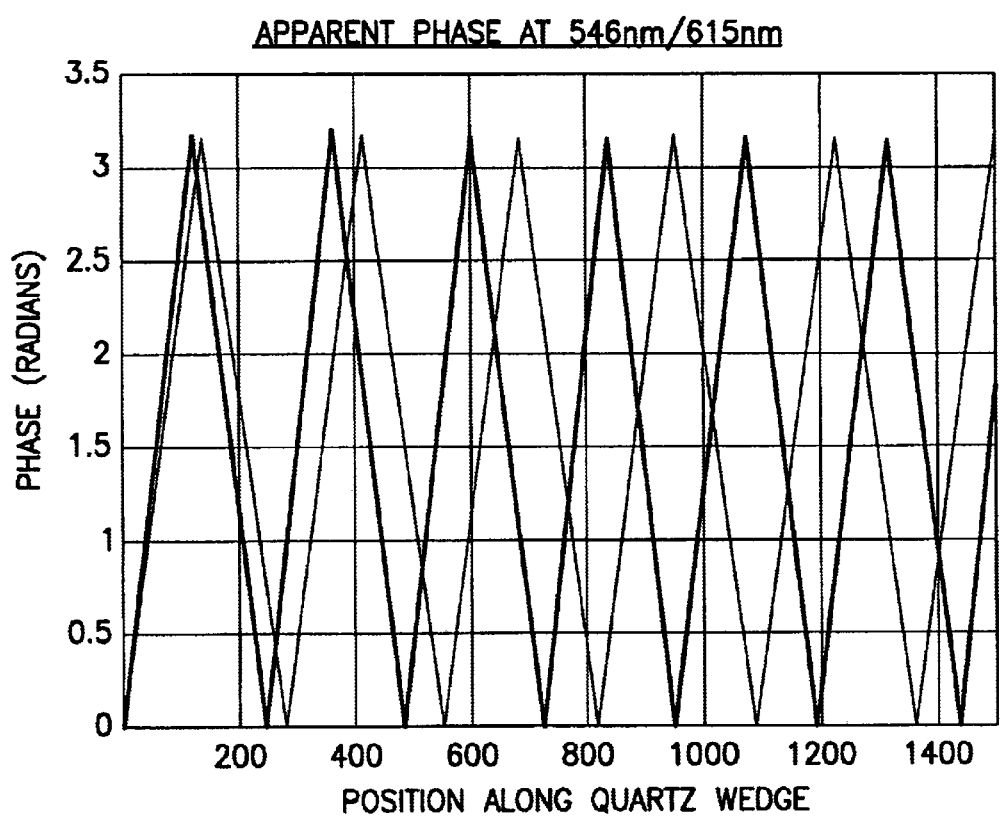
FIG. 1 shows the apparent phase $\delta_0$ for a wedged piece of quartz, at different points along the wedge. These were observed at $\lambda_1=546$ nm and again at $\lambda_2=615$ nm, and plotted as lines 11 and 12.
Figure 2:
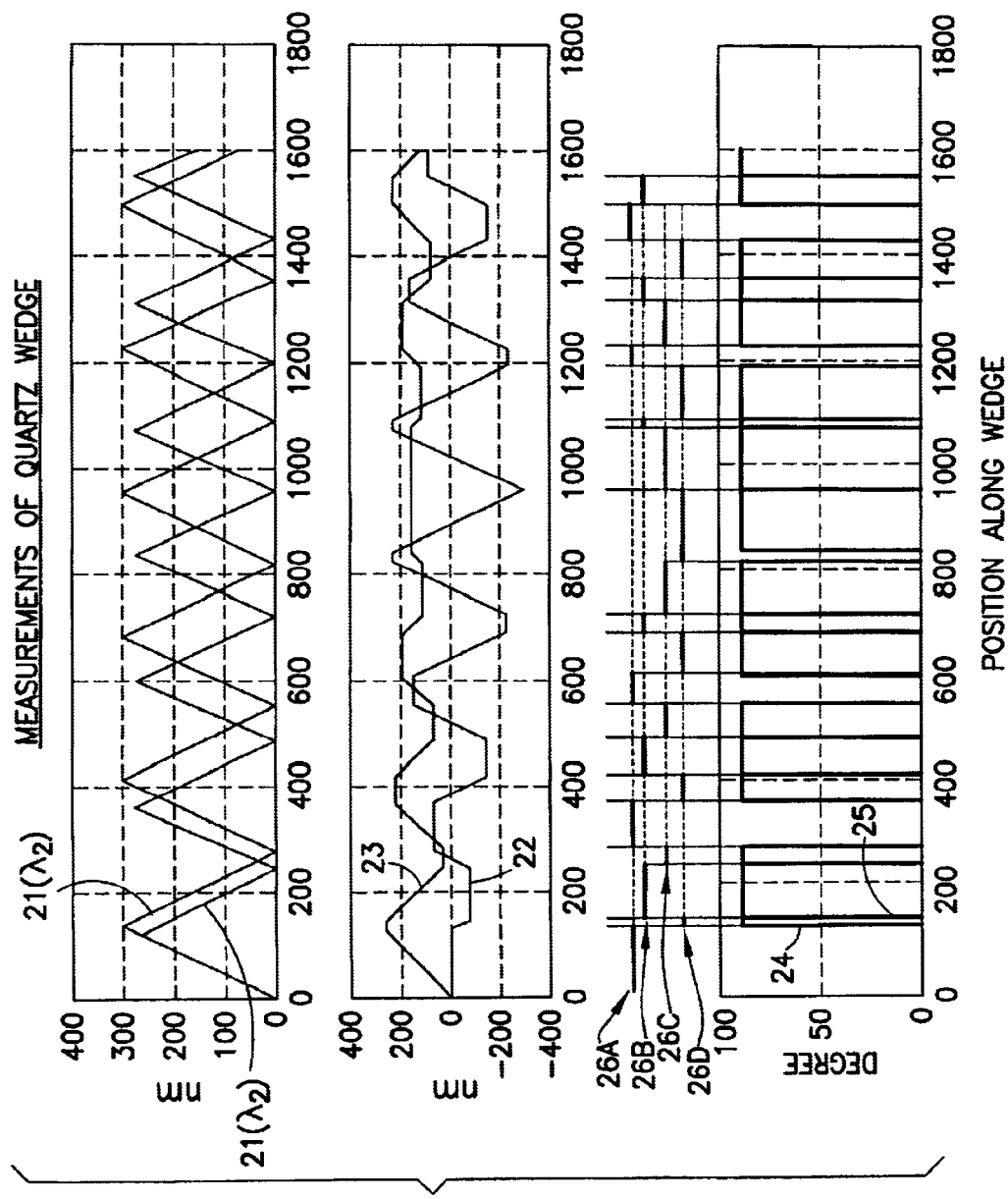
FIG. 2 shows a diagram of the apparent retardance $R_0$ as curve 21, along with the difference in apparent retardance $R_0$ $_{difference}=R_0(\lambda_1)-R_0(\lambda_2)$ as curve 22, and the mean apparent retardance $R_0$ $_{mean}=[R_0(\lambda_1)+R_0(\lambda_2)]/2$ as curve 23. The apparent fast axis orientation is plotted for $\lambda_1$ and $\lambda_2$ as curves 24 and 25, respectively. These are used to define cases A, B, C, and D, which are identified as regions 26a, 26b, 26c, and 26d.

Throughout this description, certain embodiments will be described in terms of apparent phase, and others in terms of apparent retardance. This is done to illustrate that either approach is possible, and that indeed the two are equivalent. Similarly, while certain hardware is described being suitable for purposes of acquiring the images of apparent phase and fast axis orientation, any hardware may be used to acquire this information without deviating from the spirit of the present invention.

The preferred embodiment uses an optical system such as that described in Oldenbourg to obtain the images of apparent retardance and fast axis orientation at every point in the sample. These are made at two wavelengths $\lambda_1$ and $\lambda_2$ which are chosen so that the difference between them meets the condition $$m_{max}=\lambda_1/[\lambda_2-\lambda_1] \qquad [6]$$

where $m_{max}$ is the highest order, m, that needs to be resolved by the system. For example, in a first preferred embodiment, the wavelengths are $\lambda_1$=546 nm and $\lambda_2$=577 nm, so the maximum order that can be observed is $$m_{max}=546/[577-546]=546/31=17 \qquad [7]$$

In a second preferred embodiment, the wavelengths are $\lambda_1$=546 nm and $\lambda_2$=615 nm, and the maximum order that can be resolved is $m_{max}$=7.9. This system is suitable for use with samples of lower retardance.

On the other hand, the wavelengths cannot be chosen to be arbitrarily close to one another, since there will be noise in the measurement of apparent retardance, and the proper practice of this invention requires that the error not exceed $+/-[\lambda_2-\lambda_1]/2$. Failure to meet this condition will result in mis-identification of order, m.

Means for switching between the two wavelength bands can include mechanical filter wheels, tunable filters, or use of two or more sources such as lasers, LEDs, or other lamps that are electrically switched on in time-series as needed. It is sufficient that the source emission be changed, or that a broadband source be differently filtered between the two states, and any means which achieve this result are suitable.

In a preferred embodiment, the source is a halogen lamp that is filtered by a dual-band interference filter from Chroma Technology (Brattleboro, Vt.) to yield two distinct passbands, centered at 546 nm and 615 nm, with nominal bandwidths of 30 nm each. These then pass through a liquid crystal color switch, which transmits one of the two bands according to the voltage applied to the liquid crystal element. Such liquid crystal components are available from CRI, Inc. (Boston, Mass.) or Color Link (Boulder, Colo.).

The optical design of the Oldenbourg instrument is described more fully in U.S. Pat. No. 5,521,705, the entire contents of which are hereby made a part of this application. This instrument uses a linear polarizer together with a $\lambda/4$ retarder, which must be suitable for use at both wavelengths. One approach for this is to make an achromatic $\lambda/4$ wave plate, using designs that are known in the art. These parts are also commercially available from Meadowlard Optics (Frederick, Colo.). Alternatively, one may construct the $\lambda/4$ plate as a liquid crystal variable retarder (also available from Meadowlark), and adjust the drive signal as the wavelength is switched, so it always expresses $\lambda/4$ for the wavelength being used. Techniques for this will be familiar to those skilled in polarized light optics.

Alternatively, one may image the apparent retardance $R_0$ and orientation using the apparatus described in Mason, U.S. Pat. No. 5,917,598, the contents of which are hereby incorporated in full. For purposes of practicing the present invention, one would utilize an embodiment of Mason that is based on monochromatic, rather than broad-band light. There is no need for spectrometers to analyze the spectral content of the light that passes through the sample. As a result, one can and preferably does utilize imaging detectors, rather than point detectors, to obtain an image of the entire sample at once.

The apparatus of Mason consists in a preferred embodiment of a light source, a linear polarizer, a Fresnel rhomb, the sample to be measured, and three detectors that receive light through separate polarizers each at a different angle. Mason specifically teaches 0°, 120°, and 240° and this could be employed here as well. The need for plural detectors viewing the same sample region is not explicitly addressed in Mason's patent, but it can be achieved by a variety of means such as using spatially adjacent detectors, or by using beamsplitters to share the light from a common lens or viewing port among the various detectors. Each detector would have its own polarizer at a selected orientation, as taught by Mason.

Wavelength switching in the context of Mason involves using an illumination source whose wavelength may be changed, for which the equipment listed above in the first preferred embodiment is apt. Alternatively, wavelength selection means may be incorporated into the detectors. The choice of whether to use a tunable source or tunable detectors, and in the latter case, where to situate the filters, would be made according to the usual design considerations such as cost, size, and so on.

The Fresnel rhomb is normally fairly achromatic and could be used at two wavelengths without difficulty. Or, achromatic $\lambda/4$ plates or tuned $\lambda/4$ plates as described above could be used instead of the Fresnel rhomb.

Using the apparatus just described based on Mason, or that of Oldenbourg, or any system which produces readings of $R_0$ and fast axis orientation, one obtains a first image at $\lambda_1$, and then takes a second image at $\lambda_2$. These are then analyzed to determine the actual R and actual fast axis direction corresponding to the observations.

Typically this is implemented on a computer running a program written for this purpose, and incorporating suitable logic and algorithms as will be described below. In an imaging system, the determination follows the same procedure for every pixel in the image. For purposes of determining R and the actual fast axis in the sample, each pixel is treated independently, without regard for the spatial content or structures in the sample. Two algorithms are shown in detail below, but other approaches are possible that are equivalent or that are based on the same principles and achieve the same results.

Both algorithms are based on utilizing the fact that when the actual retardance falls in the range $[m\lambda, (m+\frac{1}{2})\lambda]$, the apparent fast axis is the true fast axis, and the equation that relates apparent to actual retardance is [5a], not [5b]. Equivalently for phase δ, one should use equation [4a] not [4b]. Conversely, when the actual retardance is in the range [(m+½)λ, (m+1)λ], the apparent fast axis is orthogonal to the true fast axis, and the equation that relates apparent to actual retardance is [5b] not [5a], or for relating apparent to actual phase, equation [4b] not [4a]. This information, plus the knowledge that the actual fast axis orientation must be the same for observations at both wavelengths, is sufficient to resolve all ambiguities.

Figure 3:
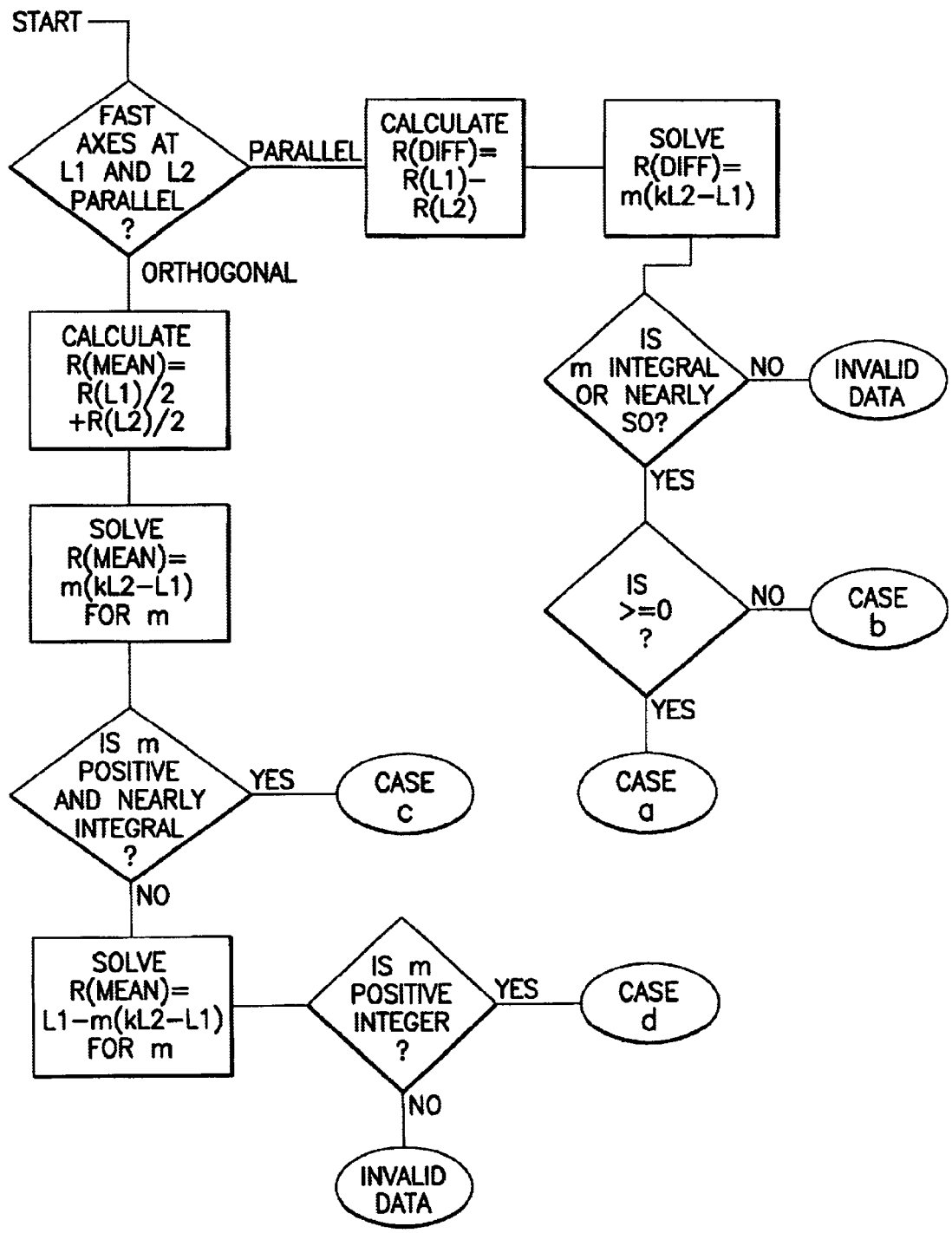
FIG. 3 shows a flow-chart which may be used to determine whether a given point should be treated as case A, B, C, or D, and how to determine the retardance R and fast axis orientation.

The first algorithm uses a case approach, which is diagrammed in FIG. 3. In this approach the pixel is determined to fall into one of four cases, corresponding to the following situations:

a) the apparent fast axis and the real fast axis coincide for both $\lambda_1$ and $\lambda_2$
b) the apparent fast axis and the real fast axis coincide for neither $\lambda_1$ nor $\lambda_2$
c) they coincide for $\lambda_1$ only
d) they coincide for $\lambda_2$ only One may determine which case is appropriate from the value of the mean apparent retardance $[R_0(\lambda_1)+R_0(\lambda_2)]/2$ and the difference in apparent retardance $[R_0(\lambda_1)-R_0(\lambda_2)]$.

In case (a), the difference in apparent retardance is given by:

$$R_{0\ diff}=m(k\lambda_2-\lambda_1) \quad [8]$$

where m is the order when viewed at wavelength $\lambda_1$, and k is the dispersion factor:

$$k=[n_s(\lambda_2)-n_f(\lambda_2)]/[n_s(\lambda_1)-n_f(\lambda_1)] \quad [9]$$

i.e. the ratio of the birefringence at $\lambda_2$ compared to the birefringence at $\lambda_1$. When condition [8] is met for a given pixel or observation, and the apparent fast axis orientations are the same at both wavelengths, the data should be treated as an example of case (a). That means that the apparent and actual retardances are related according to equation [5a], and apparent and actual phase are related according to [4a]. The value of m that applies is the value that satisfied condition [8]. The apparent and actual fast axis orientations are the same, and one may elect to use the axis determined from the observation at $\lambda_1$, at $\lambda_2$, or at some weighted average of the two readings of orientation.

Note that since some noise will be present in any given observation. Accordingly, in assessing the retardance difference condition [8], and in all comparable comparisons involving $\delta_0$ or $R_0$ such as [10], [11], and [12] described below, the data analysis program must use a suitable tolerance window to assess whether the condition has been met. Similarly, one must use a suitable angular tolerance in determining whether the fast axes are aligned or not. These tolerances in magnitude and in angle are denoted herein by $\epsilon_m$ and $\epsilon_a$. Also, in testing for angular coincidence, the comparison must report a match when one reading indicates an orientation near one end of the range, e.g. of $[-\pi/2+\epsilon_a/2]$, and the other reading indicates an axis near the other end of the range e.g. of $[\pi/2-\epsilon_a/2]$. These readings are actually separated by an angular distance of $\epsilon_a$, since fast axis orientations are indeterminate by π.

Since fast axis orientation angle is indeterminate at apparent retardances of mλ and at (m+½)λ, readings of angle obtained at or near these retardance values should be given a larger tolerance ε for purposes of assigning classes, and should be given a lower weight in determining actual fast axis orientation.

In case (b), the difference in apparent retardance is given by:

$$R_{0\ diff}=-(m+1)(k\lambda_2-\lambda_1) \quad [10]$$

When condition [10] is met for a given pixel or observation, and the apparent fast axis orientations are the same at both wavelengths, the data should be treated as an example of case (b). Once a given pixel or observation is known to fit case (b), the data analysis can proceed using equation [5b] to derive R from $R_0$, or equation [4b] to derive δ from $\delta_0$, as desired. The actual fast axis is orthogonal to the apparent fast axis orientation of $\lambda_1$ or $\lambda_2$, and may be calculated from either one, a mean, or a weighted mean as described above.

In case (c), the mean apparent retardance is given by:

$$R_{0\ mean}=m(k\lambda_2-\lambda_1) \quad [11]$$

When condition [11] is met for a given pixel or observation, and the apparent fast axis is different for observations $\lambda_1$ compared to $\lambda_2$, the data should be treated as an example of case (c). From the value of m that satisfies equation [11], one knows the order at $\lambda_1$, and the apparent and actual retardances at $\lambda_1$ are related according to equation [5a], and apparent and actual phase are related according to [4a]. One may calculate the actual fast axis variously as the apparent fast axis at $\lambda_1$, the orthogonal angle to the apparent fast axis at $\lambda_2$, or as a mean or weighted mean of the two.

In case (d), the mean apparent retardance is given by:

$$R_{0\ mean}=\lambda_1-m(k\lambda_2-\lambda_1) \quad [12]$$

When condition [12] is met for a given pixel or observation, and the apparent fast axis is different for observations $\lambda_1$ compared to $\lambda_2$, the data should be treated as an example of case (d). From the value of m that satisfies equation [12], one knows the order at $\lambda_1$, and the apparent and actual retardances at $\lambda_1$ are related according to equation [5b], and apparent and actual phase are related according to [4b]. One may calculate the actual fast axis variously as the apparent fast axis at $\lambda_2$, the orthogonal angle to the apparent fast axis at $\lambda_1$, or as a mean or weighted mean of the two.

Figure 4:
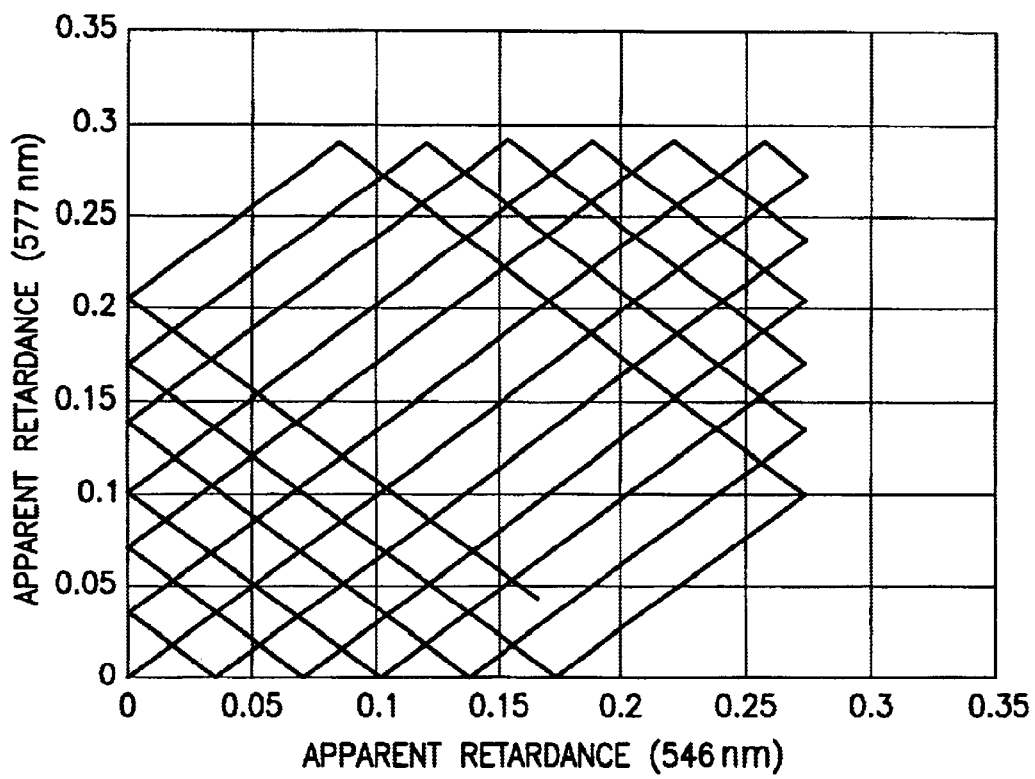
FIG. 4 shows a prior-art graph where the x and y axes correspond to the apparent retardance $R_0(\lambda_1)$ and $R_0(\lambda_2)$, respectively, and the actual retardance R is plotted as a curve that crosses over itself repeatedly, leading to intersection points.

The second algorithm uses a look-up table (LUT) approach. Recall the plot of FIG. 1, which shows the apparent phase $\delta_0$ for each wavelength as a function of position along a wedged piece of quartz, or equivalently, for linearly increasing values of actual phase, δ. The same information can also be derived theoretically. Using either method, one may construct a graph whose x and y axes are $\delta_0(\lambda_1)$ and $\delta_0(\lambda_2)$, respectively, onto which points are plotted corresponding to the values of $\delta_0$ for various values of actual phase, δ. This has been done in the prior art, and the result is shown in FIG. 4. Each point on the multiply-folded line corresponds to a particular value of actual phase δ, and its (x, y) coordinate indicates the apparent phase values $[\delta_0(\lambda_1), \delta_0(\lambda_2)]$ that would be measured for such a retardance.

While most locations are unpopulated, or are populated by a single line, there are locations where two lines intersect. At these points, there are two distinct values of δ that exhibit the same apparent phase $\delta_0$ as one another, whether measured at $\lambda_1$ or at $\lambda_2$. They are thus indistinguishable if one considers $\delta_1$ alone. This is a deficiency in the prior art, as noted above.

Figure 5A:
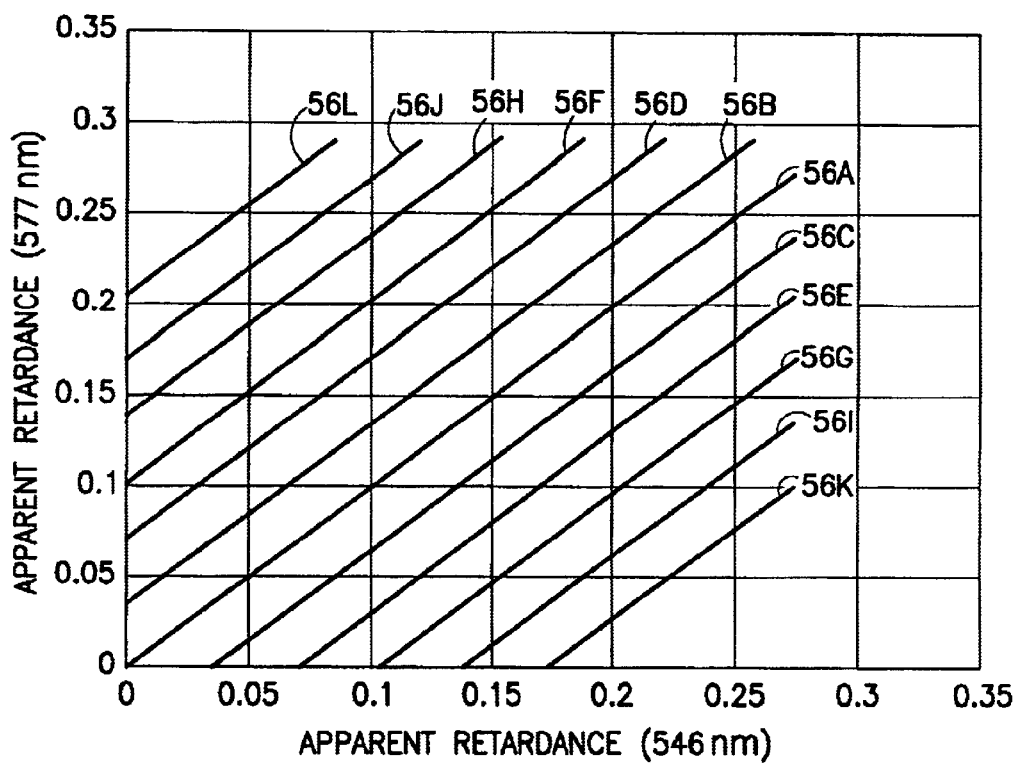
FIG. 5a shows a graph according to the present invention, where the x and y axes correspond to the apparent phase $\delta_0(\lambda_1)$ and $\delta_0(\lambda_2)$, respectively, where the actual retardance R is plotted for the case where the apparent fast axis orientation is approximately the same at the two wavelengths. The locus of points is a series of nonoverlapping line segments 51a, 51b and so on. This may be used as a LUT to derive R from the apparent phase $\delta_0(\lambda_1)$ and $\delta_0(\lambda_2)$.

If one instead constructs a similar plot to FIG. 4, except that one plots only those points δ for which the apparent fast axes observed at $\lambda_1$ and $\lambda_2$ are coincident, one obtains the graph shown in FIG. 5a. If one plots only those points 8 for which the apparent fast axes at $\lambda_1$ and $\lambda_2$ are orthogonal, one obtains FIG. 5b. These are normally constructed as look-up tables (LUTs) in computer memory, stored as a two-dimensional data array whose indices [i, j] correspond to $\delta_0(\lambda_1)$ and $\delta_0(\lambda_2)$. The contents of the data array at a given pair of indices [i, j] is simply the value of $\delta$, for a point that is occupied by the line plotted in these Figures; or a value that is known to be physically impossible, and serves as a flag value indicating invalid data, for points that are not occupied by a line in the Figures. While a line has zero width in geometry, in this discussion it is appropriate to consider a line as having finite width W of $$W = 2[\Delta\delta_{max}(\lambda_1)^2 + \Delta\delta_{max}(\lambda_2)^2)]^{1/2} \quad [13]$$

where $\Delta\delta_{max}(\lambda)$ is the maximum possible error in measurement of $\delta$ at wavelength $\lambda$. When the error $\Delta\delta_{max}(\lambda)$ is the same at both wavelengths $\lambda_1$ and $\lambda_2$, we have $$W = 2.82 \; \Delta\delta_{max}(\lambda) \quad [14]$$

So, in constructing the LUT tables, all data entries lying within a distance W/2 from a line, are given the value of the nearest point on the line. This means that measurements made in the presence of noise will map to the most likely actual sample retardance. The requirement that the mapping be unique means that the lines must not be so wide that adjacent lines overlap. From this, in turn, one can readily calculate the maximum permissible value of $\Delta\delta_{max}(\lambda_1)$, and the signal-to-noise ratio needed for a meaningful measurement.

Using these tables, one can very rapidly and simply determine the actual retardance as follows. The apparent phase $\delta_0$ and the apparent fast axis orientation is measured at two wavelengths. If the apparent fast axis orientations are the same at both wavelengths, within some tolerance +/-$\epsilon$, one looks in the LUT corresponding to FIG. 5a, at indices corresponding to $\delta_0(\lambda_1)$ and $\delta_0(\lambda_2)$. The contents will either be the desired value of $\delta$ corresponding to the measurement, or a flag value indicating an invalid measurement. If the apparent fast axis orientations are orthogonal at the two wavelengths, within some tolerance +/-$\epsilon$, one looks in the LUT corresponding to FIG. 5b, at indices corresponding to $\delta_0(\lambda_1)$ and $\delta_0(\lambda_2)$. Again, the contents will either be the value of $\delta$ corresponding to the measurement, or a flag value indicating an invalid measurement. In this way, one can rapidly convert the observed quantities to the desired sample retardance.

Figure 5B:
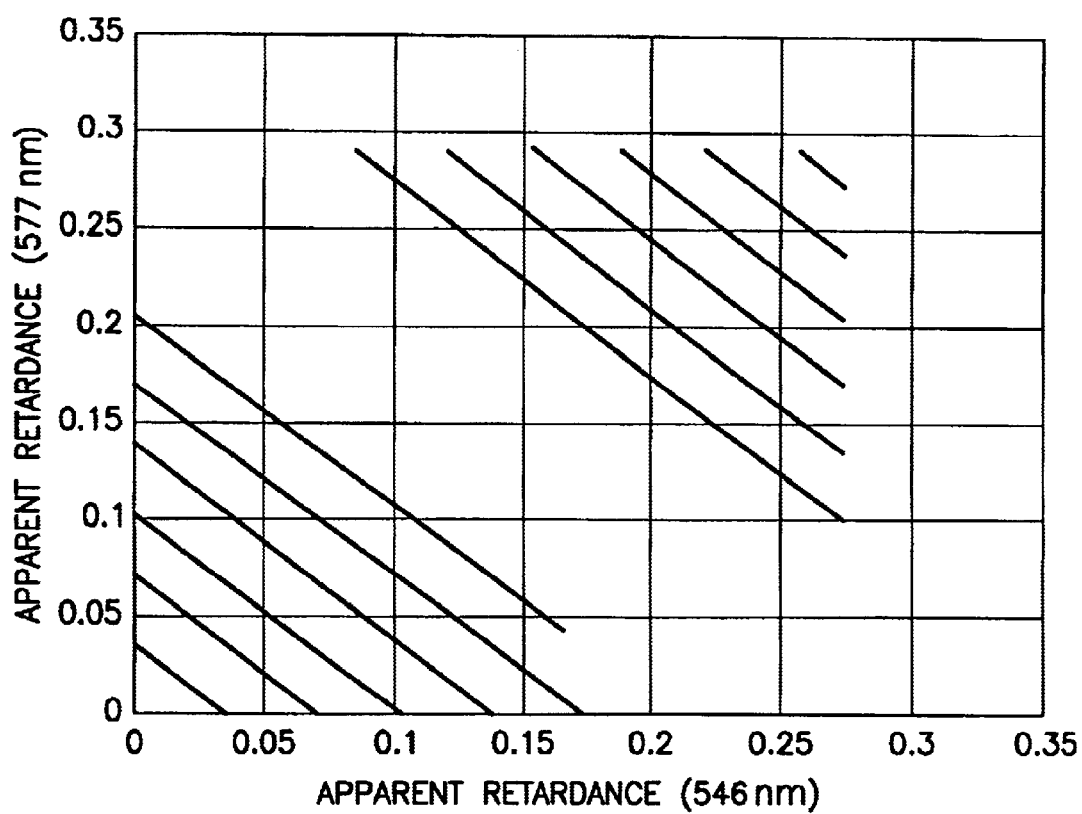
Figure 6A:
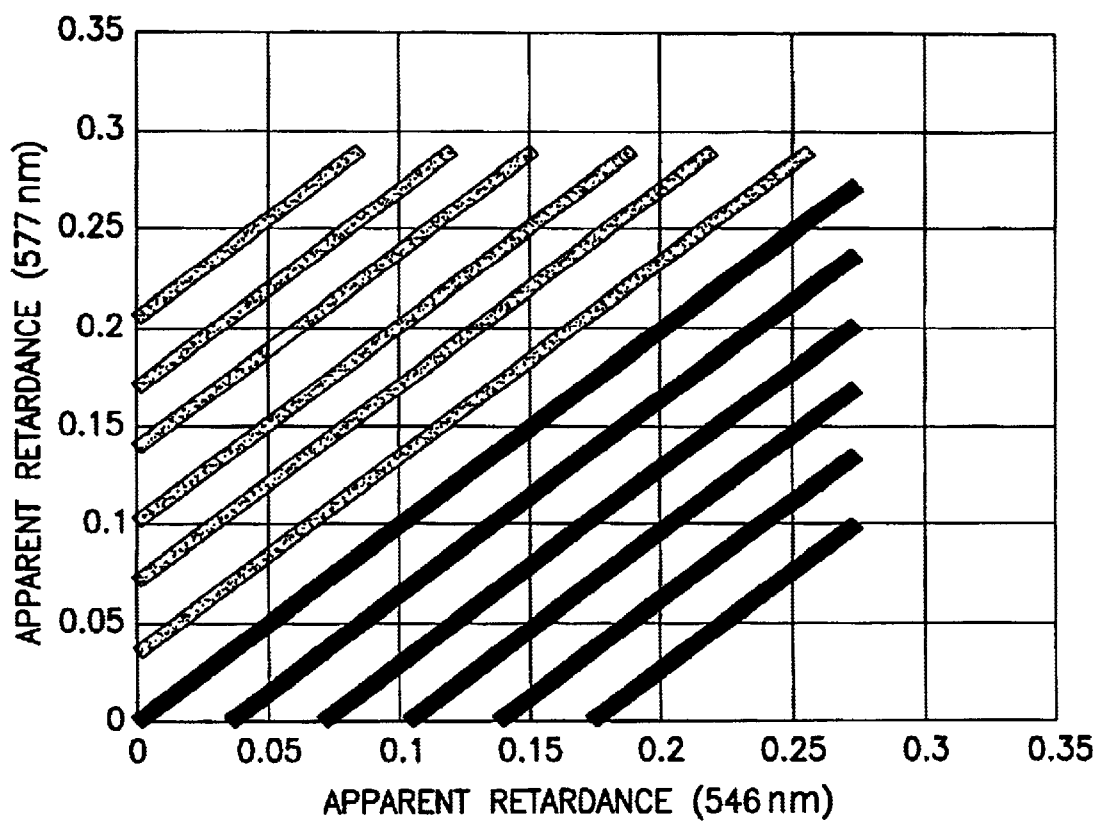
FIG. 6a shows a LUT indicating a black trace where the actual fast axis is the same as the apparent fast axis observed at $\lambda_1$ and at $\lambda_2$, a gray trace where the actual fast axis is orthogonal to the apparent fast axis observed at $\lambda_1$ and $\lambda_2$, and no trace where one does not expect valid data.
Figure 6B:
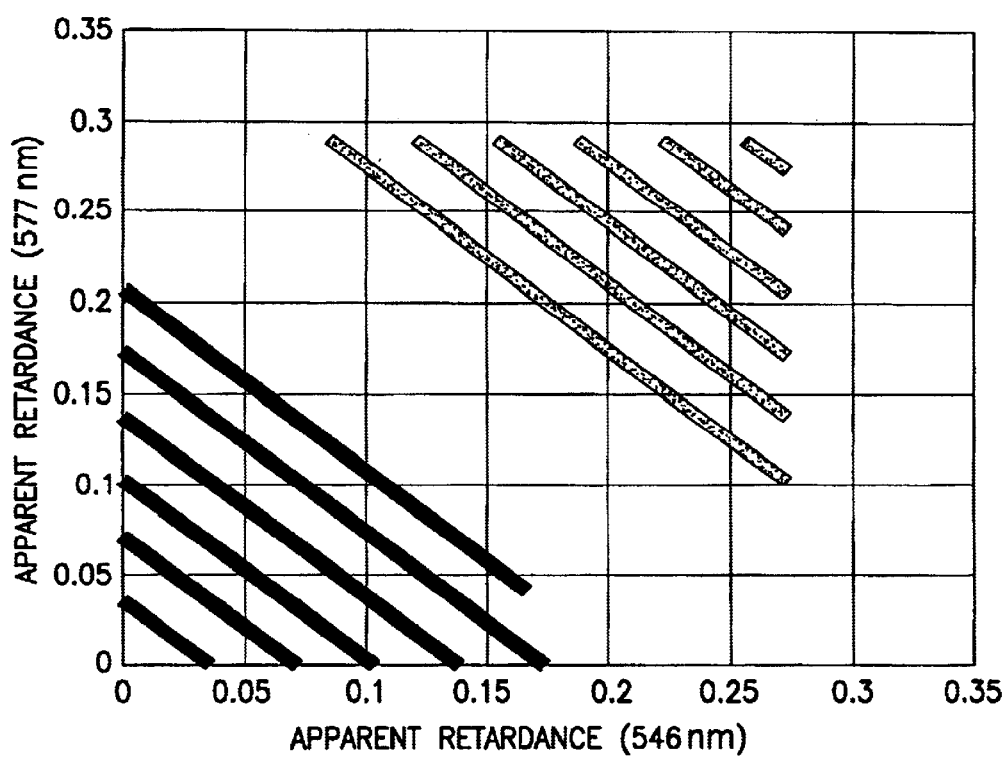
FIG. 6b shows a LUT indicating a black trace where the actual fast axis is the same as the apparent fast axis observed at $\lambda_1$ and orthogonal to that observed at $\lambda_2$, a gray trace where the actual fast axis is orthogonal to the apparent fast axis observed at $\lambda_1$ and parallel to that observed at $\lambda_2$, and no trace where one does not expect valid data.

Comparable LUT tables may be constructed to indicate the correction factor used to determine fast axis orientation, as shown in FIGS. 6a and 6b. These, like the tables represented in FIGS. 5a and 5b, are normally implemented as data arrays in computer memory, whose indices [i, j] correspond to $\delta_0(\lambda_1)$ and $\delta_0(\lambda_2)$. The contents of the data array corresponding to FIG. 6a is either 0 or $\pi/2$, for each pair of indices [i, j] that denotes a point within distance W/2 of the line plotted in FIG. 5a; those points for which the apparent fast axis orientation and the actual fast axis orientations are coincident are given a value of 0, and those points for which they are orthogonal are given a value of $\pi/2$. The determination of which case applies can be made by looking at e.g. FIG. 1, or equivalently from considering that when the actual phase $\delta$ is in the range [m$\lambda$, (m+½)$\lambda$] for both wavelengths $\lambda_1$ and $\lambda_2$, the real and actual axes are co-incident and the tabulated value should be 0; while when the actual phase $\delta$ is in the range [(m+½)$\lambda$, (m+1)$\lambda$] for both wavelengths $\lambda_1$ and $\lambda_2$, the real and apparent axes are orthogonal and the tabulated value should be $\pi/2$.

The contents of the data array corresponding to FIG. 6b is either 0 or $\pi/2$, for each pair of indices [i, j] indicating a point that lies within a distance W/2 of the line plotted in these Figures; those points for which the apparent fast axis orientation and the actual fast axis orientations are coincident at $\lambda_1$ are given a value of 0, and those points for which the actual and apparent fast axes are orthogonal at $\lambda_1$ are given a value of $\pi/2$. Once again, the determination of which case applies can be made by looking at e.g. FIG. 1, or equivalently from considering that when the actual phase $\delta$ is in the range [m$\lambda$, (m+½)$\lambda$] for wavelength $\lambda_1$, the apparent and actual is in the range [(m+½)$\lambda$, (m+1)$\lambda$] for wavelength $\lambda_1$, the apparent and actual fast axes a orthogonal and the tabulated value should be $\pi/2$.

From these tables, one can readily convert apparent fast axis measurements to actual fast axis measurements, as follows. One compares the apparent fast axis orientations at $\lambda_1$ and at $\lambda_2$ to see if they are approximately coincident or approximately orthogonal. In the former case, one consults the LUT corresponding to FIG. 6a, and looks at the data contents stored at the indices [i, j] corresponding to the observed values of $\delta_0(\lambda_1)$ and $\delta_0(\lambda_2)$. This value is then added to the apparent fast axis orientations observed at both $\lambda_1$ and $\lambda_2$, to yield corrected values for actual fast axis orientations. In the latter case, one consults the LUT corresponding to FIG. 6b, and looks at the data contents stored at the indices [i, j] corresponding to the observed values of $\delta_0(\lambda_1)$ and $\delta_0(\lambda_2)$. This value is then added to the apparent fast axis orientations observed at $\lambda_1$, and ($\pi/2$–this value) is added to $\lambda_2$, to yield corrected values for actual fast axis orientations. Either of these values may be used, or a mean or weighted mean of the two, as the best estimate to the actual fast axis orientations.

As noted before, one must take care to account properly for cases where the two angles lie at opposite ends of the range of angles, typically [0, $\pi$] or [–$\pi/2$, $\pi/2$]. For example, the mean orientation for two observations that yielded angles of ($\pi$–0.01) and (0.00) should be ($\pi$0.005), not ($\pi/2$–0.005).

An improvement can be made to the LUT system, which takes note of the fact that the fast axis orientation is indefinite for certain values such as m$\lambda$, and in practice is poorly measured (due to the effect of noise) as one approaches these values. The fast axis orientations are at $\lambda_1$ and $\lambda_2$ are compared in order to determine which LUT should be used, such as 5a vs. 5b, or 6a vs. 6b. Yet if the fast axis determination is wrong, the wrong table will be used, with the likely result that an invalid measurement will be indicated.

This situation can be avoided by identifying those regions in the LUT corresponding to areas where fast axis determination is inherently indefinite or imprecise in practice; and populating both tables corresponding to 5a and 5b with any points found in either. That way, even if the determination of whether the fast axes are parallel or orthogonal is mistaken, and one uses the wrong LUT, it will contain the accurate value of $\delta$ corresponding to the observation.

Figure 7A:
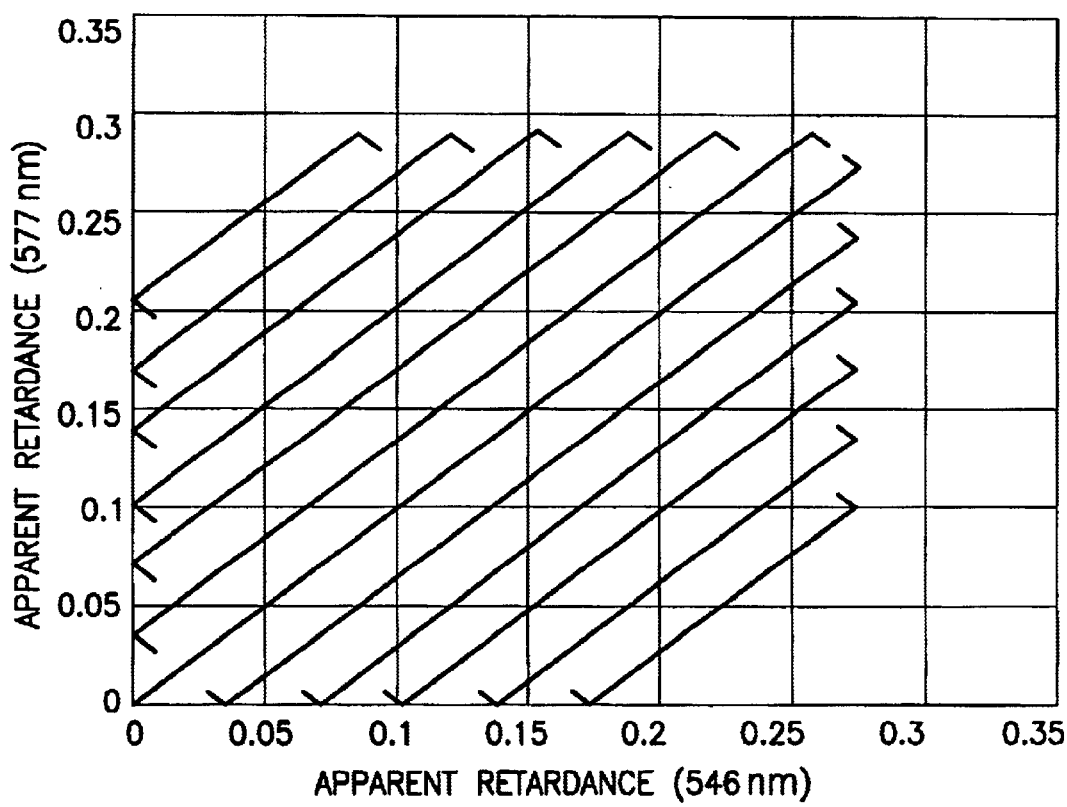
FIG. 7a shows a modification of LUT 5a which incorporates nonoverlapping points from graph 5b near its perimeter. This is useful since the determination of fast axis orientation becomes noisy as one approaches $\delta_0=0$ or $\delta_0=\pi/2$, where it is indeterminate.
Figure 7B:
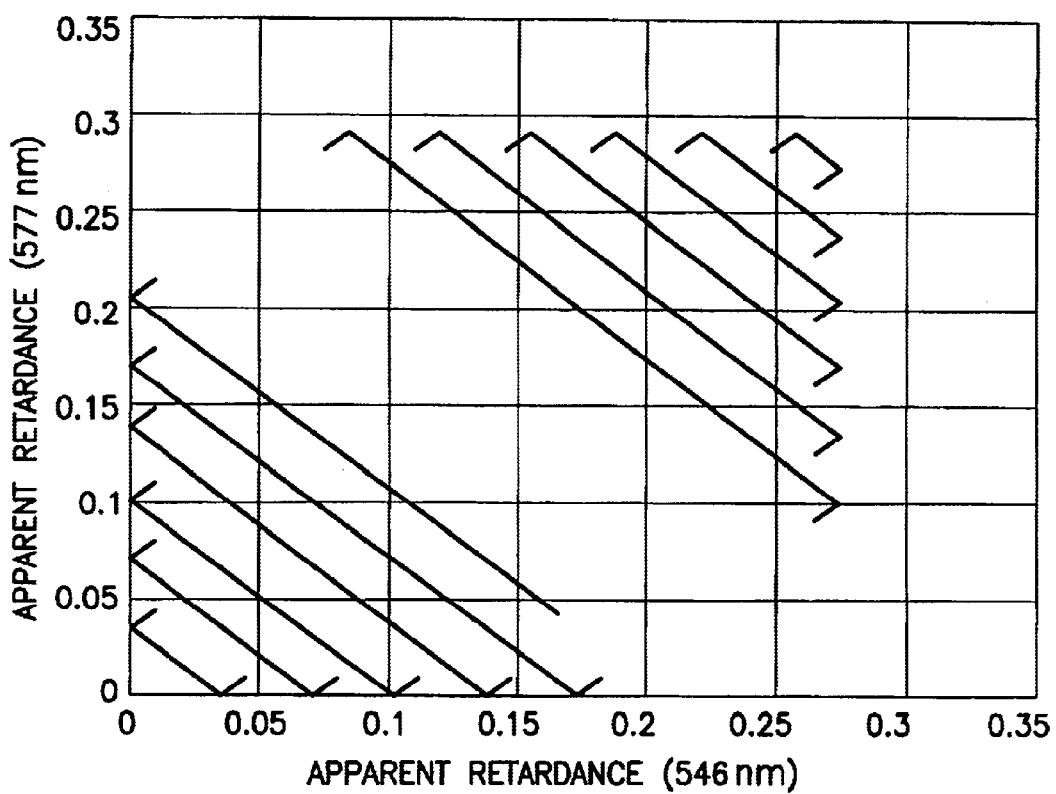
FIG. 7b shows the equivalent LUT for the case where the apparent fast axis orientations are approximately perpendicular for the two wavelengths.
Figure 8:
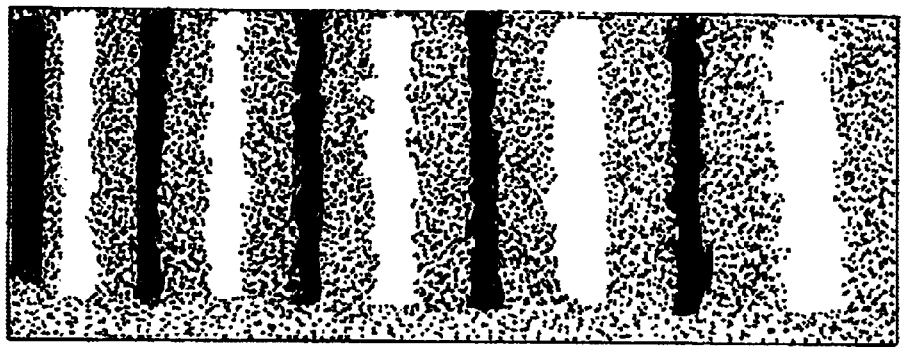
FIG. 8 shows an image of the apparent retardance and fast axis orientation of a quartz wedge taken at $\lambda_1$. The light and dark patterns indicate the fringes as viewed at this wavelength.
Figure 9:
FIG. 9 shows an image of the retardance and fast axis orientation of the quartz wedge, derived from the data in 8 and silmilar data taken at $\lambda_2$ according to the method of the present invention. The grayscale is adjusted to accommodate the full range of retardance expressed by the quartz wedge.

This is illustrated in FIGS. 7a and 7b, which have populated all points from both LUTS in common, in the regions where either $\delta_0(\lambda_1)$ or $\delta_0(\lambda_2)$ lie within $\gamma$ of 0, or within y of $\pi/2$. That region corresponds to the perimeter of the LUT, namely those points lying within $\gamma$ of its edge. Note that this does not lead to the ambiguity problem of the prior art, described earlier in connection with the Stockley patent. That problem occurs at points where two lines of differing $\delta$ intersect on the graph or LUT, and there are no such intersecting lines in this perimeter region provided $\gamma$ is sufficiently small, a condition that is readily attained in practice.

Another aspect of the invention is the capability to determine retardance for samples for which the dispersion in birefringence is unknown. Prior-art methods such as Sakai et. al. require knowledge of the dispersion, such as a Cauchy fit, before a measurement can be made. Indeed, the present invention provides a way to determine and measure the birefringence dispersion, defined as k in equation [9], above.

Knowledge of the precise value of birefringence dispersion provides a means for materials identification, by comparison of the observed birefringence dispersion against known tabulated values. This is useful in forensics, fiber analysis, and the like, because while the amount of retardance depends upon the sample thickness and the degree of stress or elongation of the material, the dispersion of birefringence with wavelength is truly a function of the material rather than its preparation, form, dimensions, aspect, or degree of stress.

Consequently, the measurement of birefringence forms a useful capability for matching materials against a library of known types with known birefringence dispersion values; or comparing individual samples against others to gauge whether their composition is like or unlike; or for monitoring the quality of samples from a manufacturing process in which the birefringence dispersion is observed to vary with composition, treatment, or other aspects of manufacture.

One way to achieve a measurement of birefringence dispersion is the following. When an image is taken of a specimen, the apparent phase $\delta_0(\lambda_1)$ and apparent phase $\delta_0(\lambda_2)$ are plotted for each pixel along the x and y axes, respectively. Those pixels for which the apparent fast axis orientation is the same at $\lambda_1$ and $\lambda_2$ are plotted on a first graph, termed graph A; and those pixels for which the apparent fast axis orientation at $\lambda_1$ is orthogonal to that at $\lambda_2$ are plotted on a second graph, termed graph B. It is preferable that this be performed using hardware that acquires an entire image at once, and so has a large population of pixels to analyze. However, if a sample is or may be heterogeneous in composition, the analysis being described may be performed for subregions or subpopulations within an image, which for one reason or another are felt to represent a like material type.

From the plots, clusters of points are identified. In graph A, clusters are sought for which the apparent slope dy/dx is approximately $$\text{slope}_{estimate} \approx \lambda_2/\lambda_1 \quad [15a]$$

while in graph B, clusters are sought for which the apparent slope dy/dx is approximately $$\text{slope}_{estimate} \approx -\lambda_2/\lambda_1 \quad [15b]$$

Techniques for identifying such clusters are well-known to those familiar with statistics and data analysis. For these clusters, one performs a linear regression to determine the actual slope, $\text{slope}_{actual}$, which is related to the dispersion k by the relationship $$\text{slope}_{actual} = k\lambda_2/\lambda_1 \quad [16a]$$

for graph A, and $$\text{slope}_{actual} = -k\lambda_2/\lambda_1 \quad [16b]$$

for graph B. From these, a first estimate is determined for k, and one may then calculate a trial set of LUTs such as 5a and 5b. These are compared against the actual data plots, and k may be adjusted in an iterative fashion to achieve a best fit between the actual locations and the locations of the lines in the trial set of LUTs, using a root-mean-square distance measure of similar metric. The path defined in the LUTs by mapping $\delta$ versus $\delta_0(\lambda_1)$ and $\delta_0(\lambda_2)$ always includes the point (0, 0) in table A, since only the slope is uncertain, not the offset, which must necessarily be zero. From this enterprise of plotting hypothetical LUTs for various values of k and comparing the resultant paths against actual data locations, one obtains an extremely sensitive measure of birefringence dispersion, especially when there are many points in the image, and at least some of the points exhibit high values of retardance. Once k has been determined, $\delta$ or R may be determined using the LUT approach, the case-based approach, or any other approach consistent with the ends set forth in the invention.

While the birefringence measurement has been illustrated using a method based on LUTs in $\delta_0$, it is equally possible to perform it using a set of LUTs in $R_0$, following along the same lines. In this case the initial trial values are $$\text{slope}_{estimate} \approx +1.00 \quad [17a]$$

for table A, or $$\text{slope}_{estimate} \approx -1.00 \quad [17b]$$

for table B, the wavelength ratios falling out in this representation since these LUTs represent absolute path difference (i.e., retardance) rather than phase angles which depend inversely on wavelength. Similarly, when the cluster fits are performed, the apparent slope is simply k, or –k, for clusters in table A or table B, respectively.

It is also possible to use the case approach as a basis for finding dispersion. One method for doing so is to calculate the difference in apparent retardance $[R_0(\lambda_1)-R_0(\lambda_2)]$ and the mean apparent retardance $[R_0(\lambda_1)+R_0(\lambda_2)]/2$ for all points in the image. The difference in apparent retardance is then plotted for those points having apparent fast axes that are parallel to one another at $\lambda_1$ compared to $\lambda_2$. These should cluster at $$R_{difference} = \{0, +/-(k\lambda_2-\lambda_1), +/-2(k\lambda_2-\lambda_1) \ldots +/-m(k\lambda_2-\lambda_1)\} \quad [18]$$

as may be deduced from equations [8] and [10] above. The mean apparent retardance is then plotted for those points having apparent fast axes that are orthogonal to one another at $\lambda_1$ compared to $\lambda_2$. These should cluster at $$R_{mean} = \{(k\lambda_2-\lambda_1), 2(k\lambda_2-\lambda_1) \ldots m(k\lambda_2-\lambda_1)\} \quad [19a]$$

and at $$R_{mean} = \{\lambda_1-(k\lambda_2-\lambda_1), \lambda_1-2(k\lambda_2-\lambda_1) \ldots \lambda_1-m(k\lambda_2-\lambda_1)\} \quad [19b]$$

By adjusting the value of birefringence dispersion k so that the locations of the actual clusters are best matched to the theoretical cluster locations, one can arrive at an excellent estimate of k for the material being measured.

So while there have been shown various embodiments, arrangements, and methods shown, these can be used in combination, or together with other known art, as will be apparent to those skilled in the art. Such combinations, as well as modifications, equivalent arrangements, substitutions, and the like, are within the scope of the invention, which is limited in scope only by the attached claims. All references cited herein are incorporated by reference.

I claim:

1. A system for determining actual retardance of at least one point in a sample, comprising an imaging polarimeter that produces a set of readings of the apparent retardance and the apparent fast axis orientation for the at least one point using light of selectable wavelength band;

a controller for selecting a first wavelength and of light and obtaining a first set of polarimeter readings comprising a first apparent retardance and a first apparent fast axis orientation at the at least one point, and for selecting a second wavelength band of light and obtaining a second set of polarimeter readings comprising a second apparent retardance and a second apparent fast axis orientation at the at least one point; and a processor for determining accurate values of optical retardance at the at least one point using the first and second apparent retardance and the first and second apparent fast axis orientation readings at the at least one point, whereby the processor is capable of unambiguously resolving the actual retardance at the at least one point.

2. A system in accordance with claim 1, wherein the polarimeter comprises one or more electro-optic modulators.

3. A system in accordance with claim 2, wherein the electro-optic modulators comprise one of a liquid crystal cell, a photoelastic modulator, and an acousto-optic device.

4. A system in accordance with claim 2, wherein the polarimeter comprises one or more liquid crystal cells.

5. A system in accordance with claim 1, wherein the polarimeter comprises a plurality of detectors and a plurality of linear polarizers and the linear polarizers have different orientations.

6. A system in accordance with claim 1, wherein the polarimeter comprises one or more photoelastic modulators.

7. A system in accordance with claim 1, wherein the polarimeter has no mechanical moving parts.

8. A system in accordance with claim 1, wherein the polarimeter provides a two-dimensional image of the sample, whereby the processor can provide a two-dimensional image of the actual retardance of the sample.

9. A system in accordance with claim 1, wherein the polarimeter comprises an imaging detector which is one of a CCD detector, a CMOS detector, a CID detector, and an image intensifier detector.

10. A system in accordance with claim 1, wherein the processor further determines the actual first axis orientation at each of the plurality of points in the sample.

11. The system of claim 1, wherein the retardance is measured in units of one of phase, microns, or nanometers.

12. An instrument for determining the birefringence dispersion of a sample, comprising an imaging polarimeter that produces a set of readings of an apparent retardance and an apparent fast axis orientation for each of a plurality of points in the sample using light of selectable wavelength band, a controller for selecting a first wavelength band of light and obtaining a first set of polarimeter readings comprising a first apparent retardance and a first apparent fast axis orientation at each point, and for selecting a second wavelength band of light and obtaining a second set of polarimeter readings comprising a second apparent retardance and a second apparent fast axis orientation at each point, and a processor for determining the birefringence dispersion of the plurality of points in the sample using the first and second apparent retardance and the first and second apparent fast axis orientation readings of the plurality of points.

13. An instrument for materials characterization, comprising the instrument according to claim 12, and further comprising:
means for determine a material property of interest of the sample with the determined birefringence dispersion.

14. An instrument for materials identification comprising the instrument according to claim 12, further comprising:
means for comparing the determined birefringence dispersion against at least one known birefringence dispersion value for a selected material.

15. The instrument of claim 12, wherein the retardance is measured in units of one of phase, microns, or nanometers.

16. A method for determining the birefringent dispersion of a sample, comprising the steps of:

using light of a first wavelength band to measure a first apparent retardance and a first apparent fast axis orientation for each of a plurality of points in the sample;

using light of a second wavelength band to measure a second apparent retardance and a second apparent fast axis orientation for each of the plurality of points in the sample; and determining an accurate value for the birefringent dispersion of the plurality of points in the sample from data comprising the first and second apparent retardance and the first and second apparent fast axis orientation at each of the plurality of points.

17. A method of determining the actual retardance of at least one point in a sample, comprising the method of claim 16, and further comprising the step of:
using the determined birefringence dispersion to determine the actual retardance of the at least one point based on the data comprising the first and second apparent retardance and the first and second apparent fast axis orientation at the at least one point.

18. The method of claims 16, further comprising the step of:
determining a material property of the sample with the determined birefringence dispersion of the sample.

19. The method of claim 18, wherein the material property of the sample is from the group consisting of strain, crystallinity, thickness, purity, and composition.

20. The method of claim 16, further comprising the step of:
relating the determined birefringence dispersion of the sample to a birefringence dispersion of a known reference material in order to identify the material of the sample.

21. The method of claim 16, wherein the retardance is measured in units of one of phase, microns, or nanometers.

22. The method of claim 16, wherein the step of determining an accurate value of the birefringence dispersion comprises the steps of:

determining whether a first apparent fast axis orientation substantially coincides with a second apparent fast axis orientation for each of the plurality of points;

plotting points on at least one graph, wherein axes of said graph correspond to the first and second apparent retardance, and wherein each plotted point corresponds to the measured first and second apparent retardances of a point in the plurality of points in the sample;

identifying clusters of points within the at least one graph with a slope roughly proportional to unity; and performing linear regression on the clusters to determine an actual slope, thereby determining an estimated birefringence dispersion by its relationship with the actual slope.

23. The method of claim 22, wherein the step of plotting points on a graph are performed by a processor, and the graph is a data array.

24. The method of claim 22, further comprising the steps of:
  using the estimated birefringence dispersion to generate estimated points on a trial graph, wherein the axes of said trial graph correspond to the first and second apparent retardance;
  applying the generated trial graph to a measured graph of points comprising the measured first and second apparent retardance readings; and
  adjusting the estimated birefringence dispersion to achieve a best fit between the generated trial graph and the measured graph by iterating through these three steps in order to find the birefringence dispersion.

25. The method of claim 22, wherein:
  said step of plotting points on at least one graph comprises the steps of:
    plotting first points on a first graph, wherein axes of said first graph correspond to the first and second apparent retardance, and wherein each first point corresponds to the measured first and second apparent retardances of a point in the plurality of points in the sample whose first and second apparent fast axis orientation do substantially coincide;
    plotting second points on a second graph, wherein axes of said second graph correspond to the first and second apparent retardance, and wherein each first point corresponds to the measured first and second apparent retardances of a point in the plurality of points in the sample whose first and second apparent fast axis orientation do not substantially coincide;
  said step of identifying clusters of points within the at least one graph comprises the steps of:
    identifying first clusters of points within the first graph with a slope roughly proportional to positive unity;
    identifying second clusters of points within the second graph with a slope roughly proportional to negative unity; and
  said step of performing linear regression on the clusters comprises the step of:
    performing linear regression on the first and second clusters to determine an actual slope of each cluster, thereby determining the birefringence dispersion by its relationship with the actual slope.

26. The method of claim 16, wherein the step of determining an accurate value of the birefringence dispersion comprises the steps of:
  calculating at least one of a mean apparent retardance and a difference of apparent retardance for each of the plurality of points;
  plotting points of the calculated mean apparent retardance on a first line, wherein each point on the first line corresponds to a point in the plurality of points in the sample whose first and second apparent fast axis orientation do substantially coincide;
  plotting points of the calculated difference of apparent retardance on a second line, wherein each point on the second line corresponds to a point in the plurality of points in the sample whose first and second apparent fast axis orientation do not substantially coincide;
  identifying clusters of points within the first line corresponding to $\{0, +/-(k\lambda_2-\lambda_1), +/-2(k\lambda_2-\lambda_1), \ldots, +/-m(k\lambda_2-\lambda_1)\}$, wherein k=birefringence dispersion, $\lambda_1$=first wavelength band, $\lambda_2$=second wavelength band;
  identifying clusters of points within the second line corresponding to $\{(k\lambda_2-\lambda_1), 2(k\lambda_2-\lambda_1), \ldots, m(k\lambda_2-\lambda_1)\}$ and $\{\lambda_1-(k\lambda_2-\lambda_1), \lambda_1-2(k\lambda_2-\lambda_1), \ldots, \lambda_1-m(k\lambda_2-\lambda_1)\}$; and
  performing linear regression on the clusters to determine the birefringence dispersion k.

27. The method of claim 26, wherein the determined birefringence dispersion is an estimated birefringence dispersion, flyer comprising the steps of:
  using the estimated birefringence dispersion to generate estimated points on at least one trial line;
  applying the generated at least one trial line to one of the first and second lines; and
  adjusting the estimated birefringence dispersion to achieve a best fit between the generated trial line and the one of the first and second lines by iterating through these three steps in order to find the birefringence dispersion.

28. The method of claim 25, wherein the step of plotting points on a graph is performed by a processor, and the graph is a data array.

29. A method to determine the actual retardance of at least one point in a sample, comprising to steps of:
  using light of a first wavelength band to measure a first apparent retardance and a first apparent fast axis orientation for the at least one point in the sample;
  using light of a second wavelength band to measure a second apparent retardance and a second apparent fast axis orientation for the at least one point in the sample; and
  determining an unambiguous value of the actual retardance at the at least one point in the sample using the first and second apparent retardance and the first and second apparent fast axis orientation.

30. The method of claim 29, wherein the step of determining unambiguous values of the actual retardance comprises the steps of:
  (a) determining whether a first apparent fast axis orientation substantially coincides with a second apparent fast axis orientation for the at least one point in the sample; and
  (b) determining an unambiguous value of the actual retardance, for the at least one point in the sample using the result of step (a) for the at least one point and a relationship between the first apparent retardance and the second apparent retardance for the at least one point.

31. The method of claim 29, wherein the first wavelength band and the second wavelength band are chosen such that:

$$m_{\max} = \frac{\lambda_1}{[\lambda_2 - \lambda_1]}$$

where
  $m_{max}$=the highest order m that needs to be resolved;
  $\lambda_1$=the first wavelength band;
  $\lambda_2$=the second wavelength band.

32. The method of claim 29, wherein a noise in the measurement of apparent retardance must not exceed $$+/-\left(\frac{[\lambda_2 - \lambda_1]}{2}\right).$$

33. The method of claim 29, wherein the obtaining steps are performed for a plurality of points in the sample, and the step of determining is performed on the obtained values from each point of the plurality of points, the method further comprising the step of:

creating a two-dimensional image of the actual retardance of the plurality of points in a sample.

34. The method of claim 30, wherein step (a) comprises the step of:

determining whether the first apparent fast axis orientation substantially coincides with the second apparent fast axis orientation within an angular tolerance.

35. The method of claim 34, wherein step (a) further comprises the step of:

determining that the first apparent fast axis orientation substantially coincides with a second apparent fast axis orientation when both apparent fast axis orientations are within $_a/2$ of an end of an angular range.

36. The method of claim 30, wherein step (b) comprises the step of:

x) if the first and second apparent fast axes substantially coincide, using a difference in apparent retardance to determine the actual retardance of the at least one point; or y) if the first and second apparent fast axes do not substantially coincide, using a mean apparent retardance to determine the actual retardance of the at least one point.

37. The method of claim 36, wherein the difference in apparent retardance is:

$$\Delta R_0 = R_0(\lambda_1) - R_0(\lambda_2)$$

where $\Delta R_0$ = the difference in apparent retardance;
$R_0(\lambda_1)$ = the first apparent retardance;
$R_0(\lambda_2)$ = the second apparent retardance.

38. The method of claim 37, wherein step (x) comprises the steps of:

solving the following equation for m:

$$\Delta R_0 = m(k\lambda_2 - \lambda_1);$$

if m is an integer, or substantially an integer, and $m \geq 0$, using the following equation to calculate the actual retardance from either the first or second apparent retardance at the at least one point:

$$R = m\lambda_x + R_0(\lambda_x); \text{ and}$$

if m is an integer, or substantially an integer, and m<0, using the following equation to calculate the actual retardance from either the first or second apparent retardance at the at least one point:

$$R = m\lambda_x - R_0(\lambda_x);$$

wherein, if m is not substantially an integer, the measured first and second apparent retardances are invalid.

39. The method of claim 36, wherein the mean apparent retardance is:

$$\overline{R}_o = \frac{R_o(\lambda_1) + R_o(\lambda_2)}{2}$$

where $R_0(\lambda_1)$ = the first apparent retardance; and
$R_0(\lambda_2)$ the second apparent retardance.

40. The method of claim 39, wherein step (y) comprises the step of:

solving the following equation for $m_1$;

$$\overline{R}_0 = m_1(k\lambda_2 - \lambda_1);$$

if $m_1$ is an integer, or substantially an integer, and $m_1 \geq 0$, using the following equation to calculate the actual retardance from either the first or second apparent retardance at the at least one point:

$$R = m_1\lambda_x + R_0(\lambda_x); \text{ and}$$

if $m_1$ is not substantially an integer or $m_1 \geq 0$, solving the following equation for $m_2$:

$$\overline{R}_0 = \lambda_1 - m_2(k\lambda_2 - \lambda_1)$$

if $m_2$ is an integer, or substantially an integer, and $m_2 \geq 0$, using the following equation to calculate the actual retardance from either the first or second apparent retardance at the at least one point:

$$R = m_2\lambda_x - R_0(\lambda_x);$$

wherein, if $m_2$ is not substantially an integer, or $m_2 < 0$, the measured first and second apparent retardances are invalid.

41. The method of claim 30, wherein step (b) comprises the steps of:

creating two two-dimensional data arrays;

selecting one of the two two-dimensional data arrays based on the results of step (a); and looking up an entry in the selected two-dimensional data array using the first and second apparent retardances as indices;

wherein the looked up entry is at least one of the actual retardance of the at least one point or a corrective factor corresponding to the at least one point, wherein said corrective factor is used to obtain the actual retardance of the at least one point from at least one of the first and second apparent retardances.

42. The method of claim 41, wherein the step of creating two two-dimensional data arrays comprises the steps of:

constructing a first two-dimensional array whose indices [i,j] correspond to a first apparent retardance value i at the first wavelength band and a second apparent retardance value j at the second wavelength band, and whose contents at a given pair of indices $[i_x, j_x]$ is one of:

an actual retardance value or a corrective factor calculated for a given point having a first apparent retardance value $i_x$, a second apparent retardance value $j_x$, and a first apparent fit axis orientation substantially coincident to a second apparent fast axis orientation; and a flag value indicating an invalid measurement; and constructing a second two-dimensional array whose indices [i,j] correspond to a first apparent retardance value i at the first wavelength band and a second apparent retardance value j at the second wavelength band, and whose contents at a given pair of indices $[i_x, j_x]$ is one of:

an actual retardance value or a corrective factor calculated for a given point having a first apparent retardance value $i_x$, a second apparent retardance value $j_x$, and a first apparent fist axis orientation not substantially coincident with a second apparent fast axis orientation; and a flag value indicating an invalid measurement;

wherein the corrective factor is used to obtain the actual retardance from at least one of the first apparent retardance and the second apparent retardance.

43. The method of claim 42, wherein the step of selecting one of the two two-dimensional data arrays based on the results of step (a) comprises the steps of:

selecting the first two-dimensional data array if the first and second apparent fast axes substantially coincide; and selecting the second two-dimensional data array if the first and second apparent fast axes do not substantially coincide.

44. The method of claim 26, wherein the difference in apparent retardances and the mean apparent retardance are calculated using the first and second apparent retardances within an magnitude tolerance $_m$.

45. The method of claim 41, wherein each two-dimensional data array corresponds to a graph whose axes are the first and second retardances and whose points correspond to a value of actual retardance, when the difference in apparent retardances and the mean apparent retardance are calculated using the first and second apparent retardances within a magnitude tolerance $_m$.

46. The method of claim 29, wherein the retardance is measured in units of one of phase, microns, or nanometers.

47. A computer-readable medium having a program of instructions for execution by a processor connected to an imaging polarimeter, said program for determining the actual retardance of at least one point in a sample, said program of instructions comprising instructions for:

(a) determining whether a first apparent fast axis orientation for the at least one point at a first wavelength substantially coincides with a second apparent fast axis orientation for the at least one point at a second wavelength; and (b) determining the actual retardance of the at least one point, based on the results of (a) and a first apparent retardance at the first wavelength for the at least one point and a second apparent retardance at the second wavelength for the at least one point.

48. The method of claim 47, wherein the retardance is measured in units of one of phase, microns, or nanometers.

* * * * *

UNITED STATES PATENT AND TRADEMARK OFFICE
CERTIFICATE OF CORRECTION

PATENT NO.   : 6,693,710 B1
DATED        : February 17, 2004
INVENTOR(S)  : Clifford C. Hoyt It is certified that error appears in the above-identified patent and that said Letters Patent is hereby corrected as shown below:

Column 19,
Line 10, replace "angular tolerance." with -- angular tolerance $\underline{\epsilon_a}$. --
Line 16, replace "within $_a/2$" with -- within $\epsilon_a/2$ --

Column 21,
Line 19, replace "an magnitude tolerance $_m$." with -- a magnitude tolerance $\epsilon_m$. --

Column 22,
Line 2, replace "magnitude tolerance $_m$." with -- magnitude tolerance $\epsilon_m$. --

Signed and Sealed this

Fourteenth Day of September, 2004

JON W. DUDAS
*Director of the United States Patent and Trademark Office*